United States Patent [19]

Bratlie et al.

[11] Patent Number: 5,080,548
[45] Date of Patent: Jan. 14, 1992

[54] TRAILER DUMPER

[75] Inventors: Kenneth A. Bratlie; David J. Miller, both of Portland, Oreg.

[73] Assignee: Columbia Trailer Co., Inc., Hillsboro, Oreg.

[21] Appl. No.: 549,213

[22] Filed: Jul. 5, 1990

[51] Int. Cl.⁵ .............................................. B65G 67/30
[52] U.S. Cl. ...................................... 414/385; 298/7; 298/17 SG; 414/368; 414/386; 414/471; 414/481; 414/577; 414/582; 414/786
[58] Field of Search .............. 298/7, 11, 17 SG, 22 R; 414/362, 368, 376, 385, 386, 391, 399, 401, 469, 471, 575, 577, 582, 481, 786

[56] References Cited

U.S. PATENT DOCUMENTS

| | | | |
|---|---|---|---|
| 516,053 | 3/1894 | Hulett | 414/362 |
| 577,500 | 2/1897 | Wilson | 414/376 X |
| 1,759,757 | 5/1930 | Patten et al. | 414/362 X |
| 3,819,070 | 6/1974 | Clarke et al. | 414/362 |
| 4,483,650 | 11/1984 | Sims | 298/11 X |

OTHER PUBLICATIONS

One Drawing Sheet Showing the Earlier Known Trailer Tipper which is Discussed in the Background Portion of the Specification on pp. 1-3 of the Application.

Primary Examiner—Robert J. Spar
Assistant Examiner—Janice Krizek
Attorney, Agent, or Firm—Klarquist, Sparkman, Campbell, Leigh & Whinston

[57] ABSTRACT

A portable low-profile tipper for dumping the contents from a trailer containing a dumpable material, includes a towable elongated frame having a back end with a deck pivotally attached thereto. The deck has a backstop for positioning the trailer during dumping. Actuators raise and lower the deck between a lowered position adjacent the frame and a raised position for dumping the trailer contents. The tipper includes a chute having fixed and pivoting components which cooperate to guide the dumpable material from a back opening of the trailer past the frame back end. The tipper frame has outwardly extending front and back stabilizers. The front stabilizers lift and lower a front end of the frame between a low-profile dumping position for receiving the trailer and a raised towing position for hitching and towing the tipper between dumping locations. A method of successively removing the contents from a plurality of trailers using the tipper is also provided.

18 Claims, 5 Drawing Sheets

TRAILER DUMPER

BACKGROUND OF THE INVENTION

The present invention relates generally to a trailer tipper or dumper for dumping the contents from a trailer containing a dumpable material, and more particularly to an improved portable tipper and an improved method of removing the contents from such a trailer. For example, such a tipper and method may be used to dump garbage from trailers at a landfill site.

Other portable trailer dumpers or tippers have been used to dump garbage from semi-truck haulable trailers at commercial dumps. One known tipper includes a haulable frame having a front end hitchable to a semi-truck for moving the tipper between different dumping locations.

This known tipper includes an upwardly pivoting deck attached to the frame back end. The deck has an upwardly extending backstop adjacent the back end of the deck to retain a trailer during tipping. Two hydraulic actuators are mounted to the frame and underside of the deck to push the deck from a lowered position in contact with the frame upwardly to a raised position for dumping the contents of the trailer. To power the hydraulic actuators, the tipper includes a hydraulic power unit mounted to the frame underside midway between the frame front and back ends.

In a lowered position adjacent the frame, the deck is substantially level at a height of nearly eleven feet above the ground surface upon which the tipper is located. To bridge this distance, the tipper has a detachable ramp extending downward from the frame front end. The frame also includes a permanently mounted intermediate ramped section for bridging a gap between the deck and the detachable ramp.

This known tipper includes front and rear stabilizer wings extending outwardly from the frame sides, with each wing having a ground-engaging float with screw-type height adjustment means. The stabilizers are adjustable to level the deck. The stabilizer floats are removed from the stabilizer wings and the wings are folded back against the frame for towing the tipper between dumping locations. To ready the tipper for moves between locations at a given site, the stabilizer floats and ramp must be removed and placed on top of the tipper.

To use this known tipper, a driver backs a trailer containing a dumpable material onto the detachable ramp, across the intermediate ramp and onto the deck until the trailer engages the deck backstop. To unhook the trailer for dumping, the driver gets out of the truck cab, which is nearly as high as the deck (approximately eleven feet above the ground surface). Any fall from such a height may seriously injure the driver. Thus, this tipper requires hand rails and barriers along the edges of the ramps and deck.

The basic manufacturing costs of such hand rails and barriers increase the initial cost of the known tipper. Furthermore, there are the labor costs associated with disassembling and reassembling the hand rails and barriers when moving the tipper from one location at a dump site to another location at the same dump site.

Tippers are inherently susceptible to side loading when the deck is elevated to dump a trailer. For example, side loading may occur when a strong cross wind blows against a side of a trailer during dumping. The deck acts as a moment arm and side loading force applies a torque to the frame. To prevent frame deformation by twisting during such side loading, this known frame requires great amounts of reinforcing steel and larger and heavier steel members in the frame. The additional reinforcing steel increases tipper manufacturing costs, as well as making the tipper heavy to haul, which increases fuel costs associated with moving the tipper.

Thus, a need exists for an improved trailer tipper and method for dumping the contents from a trailer containing a dumpable material, which is not susceptible to the above limitations and disadvantages.

SUMMARY OF THE INVENTION

It is an overall object of the present invention to provide an improved trailer tipper for dumping the contents from a trailer containing a dumpable material.

A further object of the present invention is to provide an improved portable tipper which may be moved between locations at a particular dump site quickly and efficiently.

An additional object of the present invention is to provide an improved method of removing the contents from a trailer containing a dumpable material.

A further object of the present invention is to provide a portable tipper which is safer to use than existing tippers without sacrificing performance.

Yet another object of the present invention is to provide a portable tipper which may be more economically manufactured, and which is more cost efficient to use than existing tippers.

According to one aspect of the present invention, a portable tipper is provided for dumping the contents from a trailer containing a dumpable material through a back opening of the trailer. The tipper has an elongated frame with a front end and a back end. The tipper has a deck having a front end and back end, and means for pivotally attaching the deck back end to the frame back end. The deck also has a backstop located a first distance from the deck back end for positioning the trailer during dumping. Elevating means couple the deck to the frame for pivotally raising and lowering the deck front end between a lowered position with the deck adjacent the frame and a raised position with the deck front end above the frame. The tipper also has chute means for guiding the dumpable material from the trailer back opening beyond the deck back end. In this manner, the contents of a trailer backed onto the deck may be dumped when the deck is raised to the raised position by the elevating means.

According to another aspect of the present invention, a portable low-profile tipper includes a towable frame having front and back ends. The towable frame also has hitching means at the front end for hitching the tipper to a towing vehicle. Trailer support means is pivotally attached to the frame back end for supporting a trailer during dumping. The tipper has elevating means coupling the trailer support means to the frame for pivotally raising and lowering the trailer support means between a lowered position adjacent the frame and a raised position for dumping the trailer contents beyond the frame back end. Stabilizing means is attached to and extends outwardly from the frame and terminates in ground-engaging pad means for stabilizing the tipper by engaging the ground adjacent to the tipper. The stabilizing means includes frame lifting means for lifting and lowering the frame front end between a low-profile dumping position for receiving a trailer to be dumped and a raised towing position for hitching the tipper for moving between dumping locations.

According to a further aspect of the present invention, a method is provided of successively removing the contents from a plurality of trailers, with each trailer having a back door closing a back opening, and each containing a dumpable material. The method includes the step of providing a tipper as described above. In a backing step, a first trailer containing a dumpable material is backed onto the deck when in a lowered position and into position on the deck against the backstop. The method also includes the steps of unhitching the first trailer from the first towing vehicle and opening the back door of the unhitched first trailer. The method also includes the steps of raising the chute means and the deck with the first trailer thereon each to the raised position, and dumping the first trailer contents through the back opening of the first trailer. In this manner, the contents are removed from the first trailer to provide an empty first trailer and to form a first pile of dumpable material behind the tipper frame back end. In a lowering step, the deck with the empty first trailer thereon is lowered to the lower position while leaving the chute means in the raised position. The method also includes the steps of closing the back door of the first empty trailer, hitching the empty first trailer to the first towing vehicle, and driving the hitched empty first trailer off the deck with the first towing vehicle. In a backing step, a second trailer containing a dumpable material is backed onto the lowered deck and into position on the deck against the backstop. In a lowering step, the chute means is lowered. The method then includes the step of repeating the opening, raising, lowering, closing, hitching and driving steps with the second trailer, and so on with subsequent trailers, to successively remove the contents from a plurality of trailers containing a dumpable material.

In an illustrated embodiment, the method includes a clearing away step, where the first pile of dumpable material is cleared away from behind the tipper frame back end with the chute means in the raised position. The clearing away step occurs substantially simultaneously with the steps of lowering the deck, hitching and driving away the empty first trailer, and backing the second trailer onto the deck. In the lowering step, the chute means is lowered upon completion of the clearing step. This advantageously saves time by allowing the first pile to be cleared away, without fouling the deck with portions of the dumped first pile, while the successive trailers are being moved off of and onto the deck.

These and other objects, features and advantages of the present invention will become apparent to those skilled in the art from the following description and

DETAILED DESCRIPTION OF A PREFERRED EMBODIMENT

Figure 1:
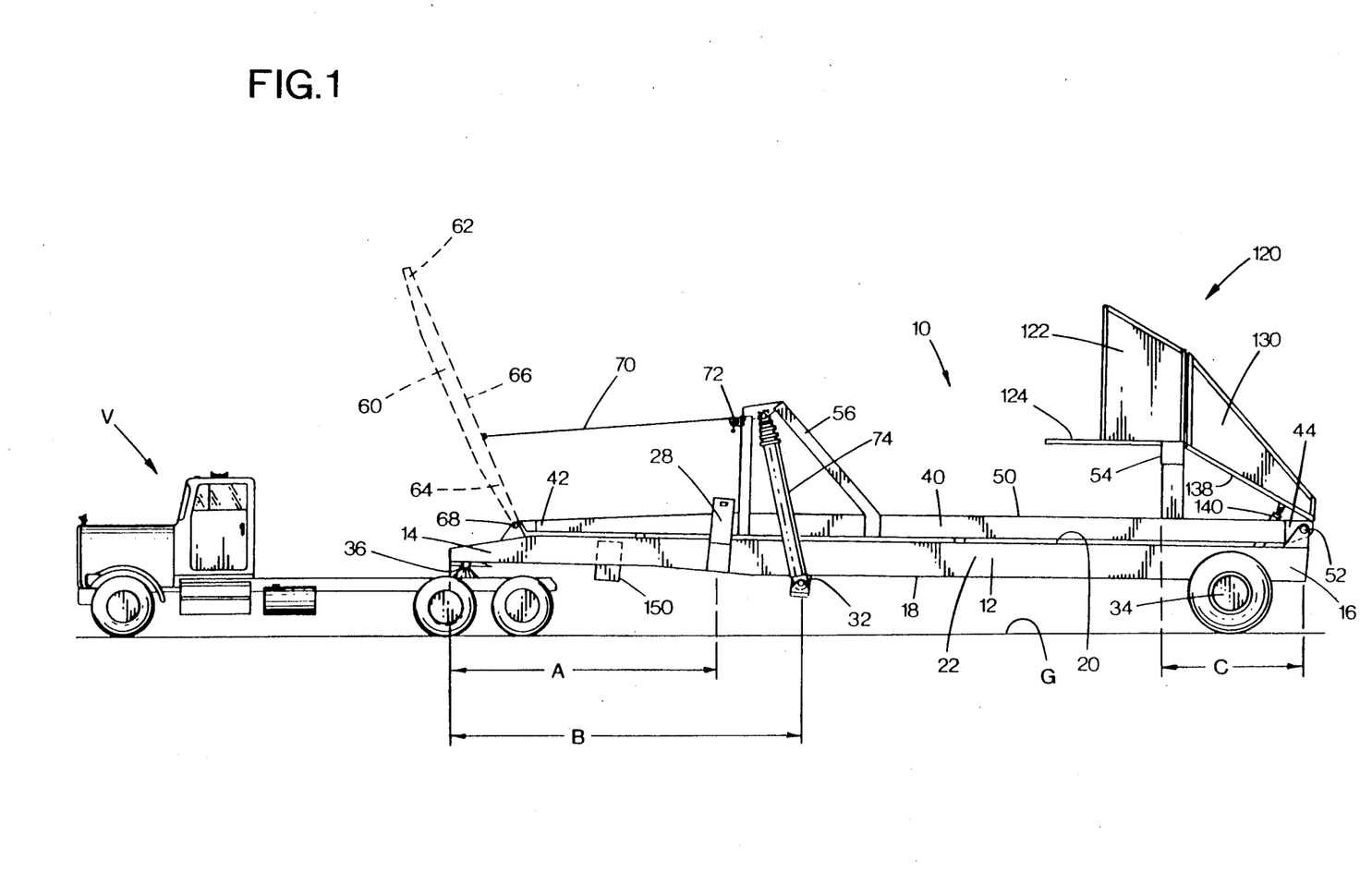
FIG 1 is a side elevational view of one form of a portable tipper of the present invention, shown hitched to a towing vehicle, such as for transportation between first and second dump sites interconnected by conventional highways.
Figure 2:
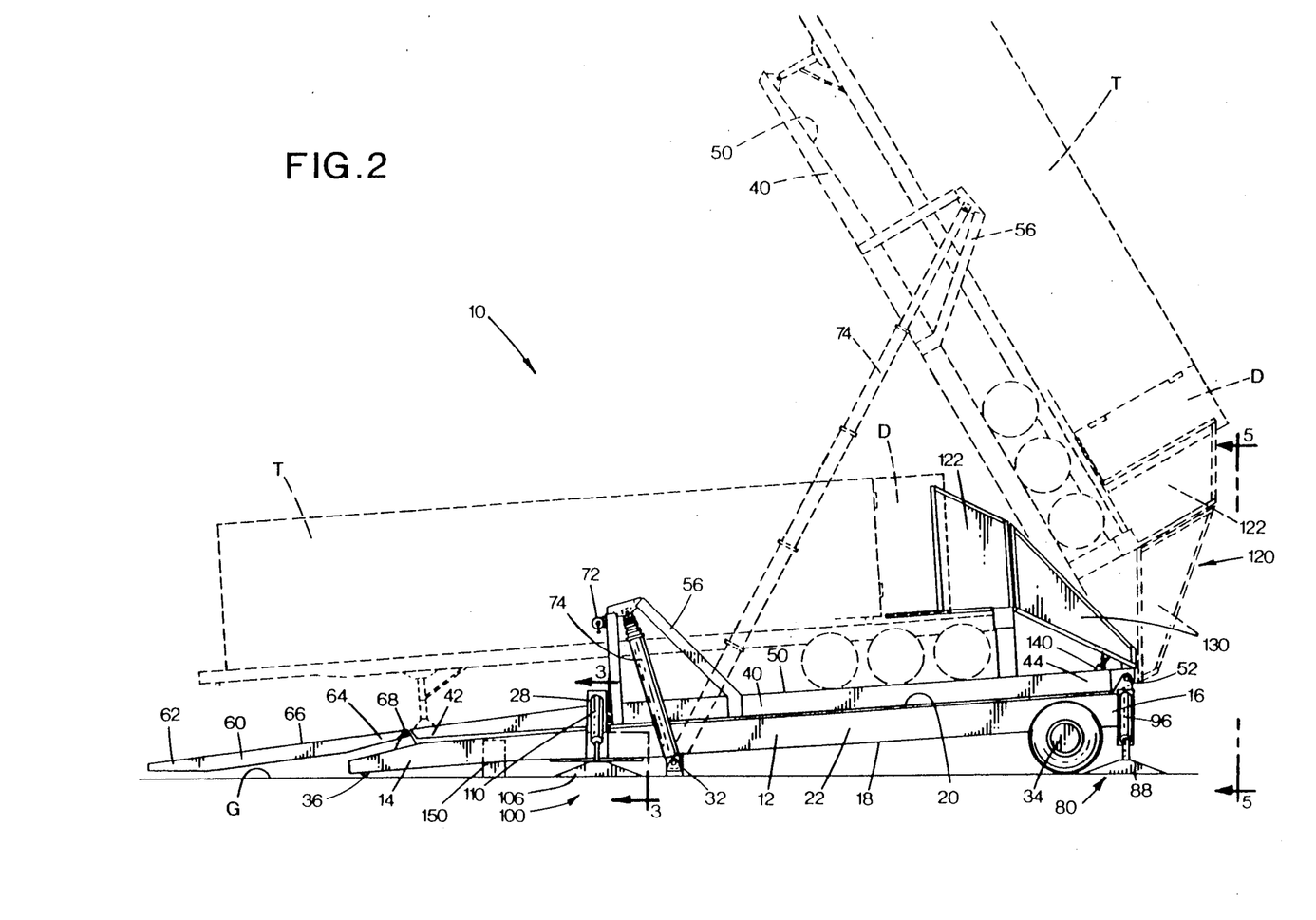
FIG. 2 is a side elevational view of the tipper of FIG. 1, showing the dumping of a trailer in phantom (dashed lines)

FIGS. 1 and 2 illustrate an embodiment of a portable, low-profile dumper or tipper 10 constructed in accordance with the present invention for dumping the contents from a trailer T containing a dumpable material (not shown). The contents are dumped through a back opening which is closeable by a door or doors D of the trailer T during transport. The dumpable material may be any type of material capable of being removed through the trailer back opening under the force of gravity when the trailer is tipped upwardly as shown in FIG. 2. For example, the dumpable material may be garbage which has been hauled to a dump or commercial landfill for deposit therein.

Figure 3:
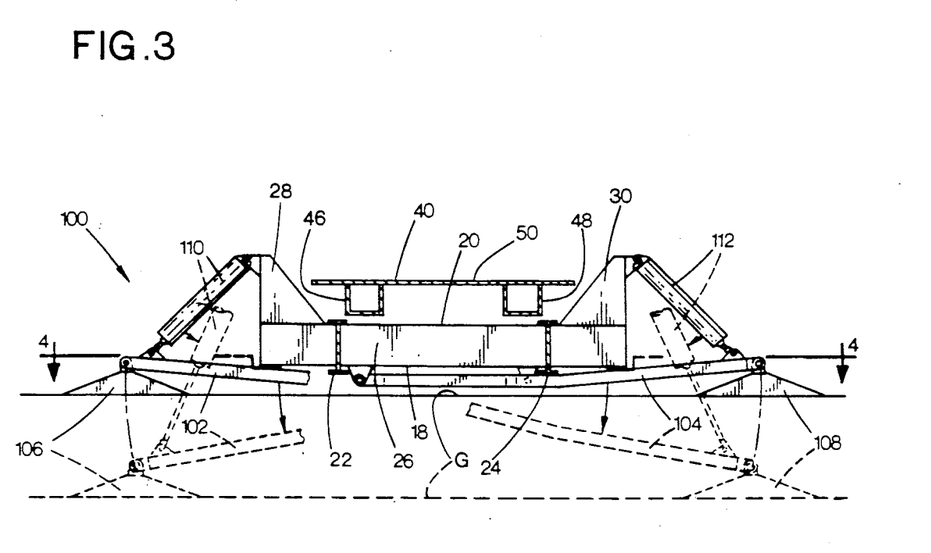
FIG. 3 is a cross-sectional elevational view taken along line 3—of FIG. 2.
Figure 4:
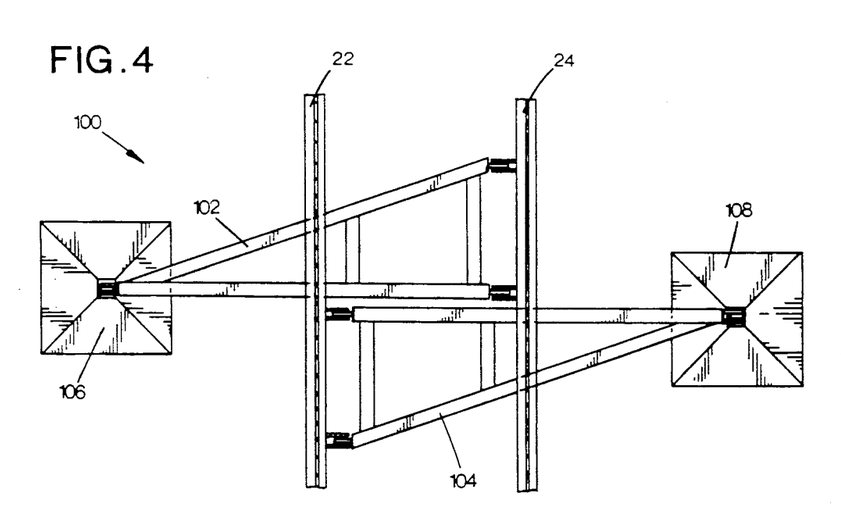
FIG. 4 is a cross-sectional plan view taken along line 4—4 of FIG. 3.

The tipper 10 has an elongated frame 12 having opposing front and back ends 14 and 16, an undersurface 18 and an upper surface 20. Referring also to FIGS. 3 and 4, the frame 12 also includes two opposing side members, such as I-beams 22 and 24, each running along the length of the tipper 10. The side I-beams may be interconnected at various positions along the length of the trailer by other structural steel support members, such as the square tubular cross member 26 which is welded to I-beams 22 and 24. The frame 12 also includes first and second opposing elevated mounting members 28 and 30 extending outwardly and upwardly from the respective I-beams 22 and 24 and the frame upper surface 20. The elevated mounting members 28 and 30 are located under a trailer T on the tipper 10 at a distance A from the forward-most point of the frame front end 14.

For purposes described further below, the frame 12 also includes a first lower mounting member 32 extending downwardly from the side I-beam 22 and a second lower mounting member (not shown) extending downwardly from the other side I-beam 24. The first and second lower mounting members, such as 32, are positioned along frame 12 at a distance B from the forward-most point of the frame front end 14.

For portability, the tipper frame 12 has a wheeled axle assembly 34 attached to the frame undersurface 18 adjacent the frame back end 16. The tipper 10 also includes towing or hitching means, such as hitch 36, mounted to the frame undersurface 18 adjacent the frame front end 14. Using hitch 36, the tipper may be hitched to a towing vehicle V, such as a semi-tractor or semi-truck, for towing the tipper 10, such as from a first dumping location to a second dumping location.

The tipper 10 also includes trailer support means, such as deck 40. The deck 40 has a front end 42, a back end 44, and two opposing side members 46 and 48. The side members 46 and 48 support a trailer-supporting upper surface 50 upon which the trailer T rests during dumping. The tipper 10 has means, such as pivot pin 52, for pivotally attaching the deck back end 44 to the frame back end 16. This pivotal attachment allows the deck 40 to be moved between a lowered position with the deck 40 adjacent the frame upper surface 20 and a raised position with the deck front end 42 elevated above the frame upper surface 20 (shown in phantom in FIG. 2) for dumping the contents from trailer T.

The deck 40 has a backstop 54 extending upwardly from the deck upper surface 50 at a distance C from the rearward-most edge of the deck back end 44. The deck 40 also has first and second elevated mounting means, each extending upwardly from one of the deck sides above the deck surface 50, such as a first elevated mounting member 56 extending upwardly from the deck side member 46.

In a preferred embodiment, the tipper 10 has optional ramp means, such as ramp 60 having front and back ends 62 and 64. The ramp 60 also has a vehicle and trailer supporting upper surface 66. The ramp back end 64 is pivotally attached to the frame front end 14, such as by pivot pin 68. The point of pivotal attachment is preferably located so the ramp back end 64 is adjacent the deck front end 42. In this embodiment, when the ramp 60 is in a lowered position, the ramp provides a smooth transition for the trailer T being driven between the deck 40 and a ground surface G surrounding the tipper 10 (see FIG. 2).

The ramp 60 may be pivoted upwardly to a raised position, as shown in phantom in FIG. 1, for moving the tipper 10, such as to a new location at a first dumping site. The ramp 60 may be secured in the raised position, such as by a cable 70 attached to an O-ring 72 on the deck elevated mounting member 56. In a preferred embodiment, the ramp 60 is detachably attached to the frame front end 14, so that ramp 60 may be detached from the frame 12, for example by removing pin 68. It may be desireable to remove ramp 60 for highway travel, such as when moving the tipper 10 from one dumping site to another dumping site.

Elevating means is provided for coupling the deck 40 to the frame 12, such as a first multi-stage collapsible hydraulic actuator 74. The first actuator 74 has one end pivotally connected to the first deck elevated mounting member 56 and a second end pivotally connected to the first frame lower mounting member 32. A second actuator (not shown) is pivotally connected to the second deck elevated mounting member (not shown) and to the second frame lower mounting member (not shown). The elevating means is provided for pivotally raising and lowering the deck 40 between the lowered position and the raised position. The deck is illustrated in the lowered position with actuator 74 collapsed, and in the raised position with actuator 74 extended (shown in phantom in FIG. 2).

Figure 5:
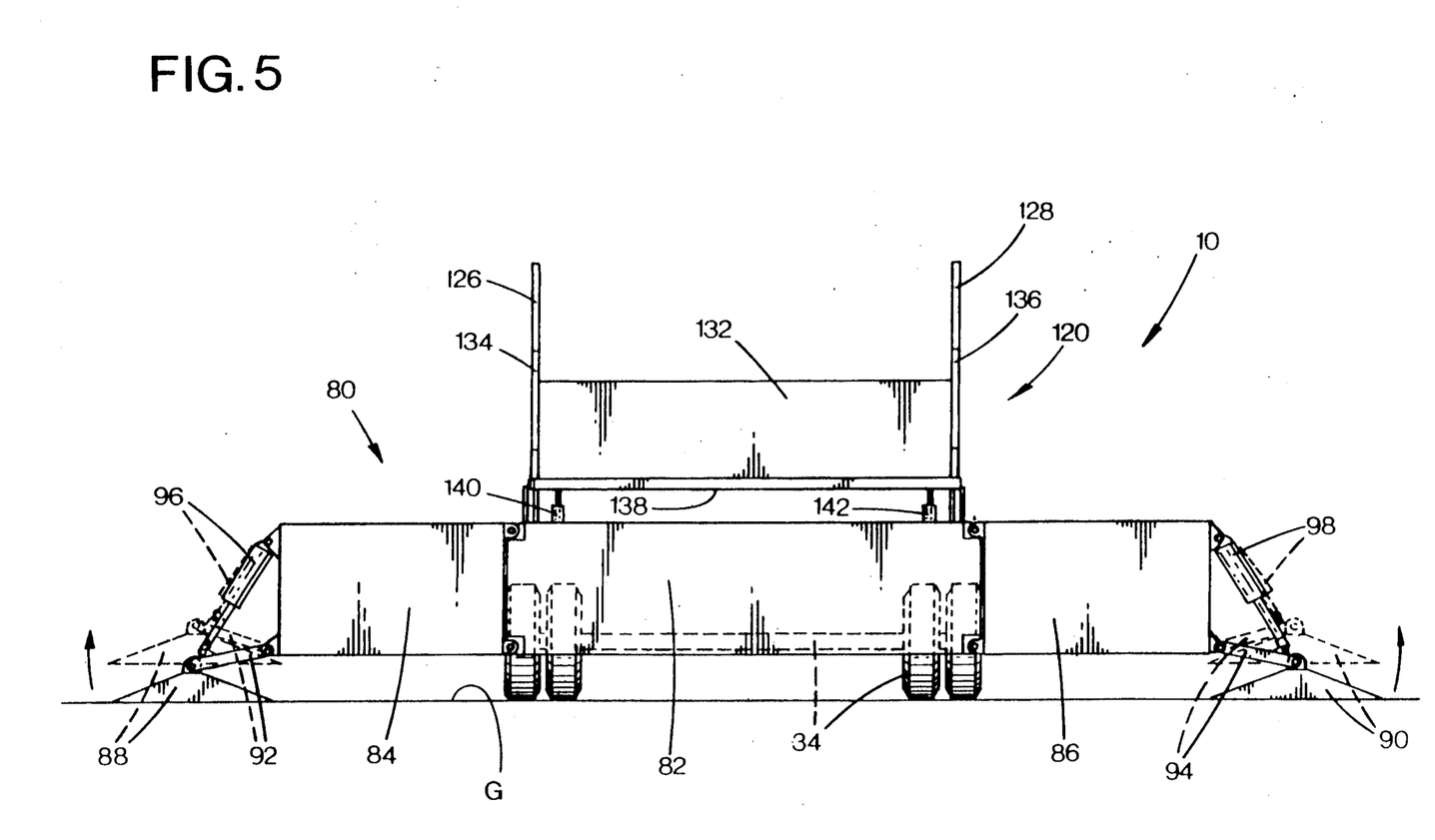
FIG. 5 is a rear elevational view taken along line 5—5 of FIG. 2.

Stabilizing means is attached to the frame 12 for stabilizing the tipper by engaging the ground surface G adjacent the tipper. Referring to FIG. 5, the stabilizing means includes back stabilizing means 80 having a central apron 82 which may be detachably attached to the frame back end 16 by pins or other means (not shown). Pivotally attached to the outboard sides of apron 82 are wing members 84 and 86. The central apron 82 cooperates with wings 84 and 86 to shield and protect the wheeled axle assembly 34 from becoming fouled by the material which has been dumped behind the tipper 10. Ground engaging pads or floats 88 and 90 are attached to the respective wing members 84 and 86 by raisable means comprising links 92, 94 and hydraulic actuators 96 and 98.

Figure 6:
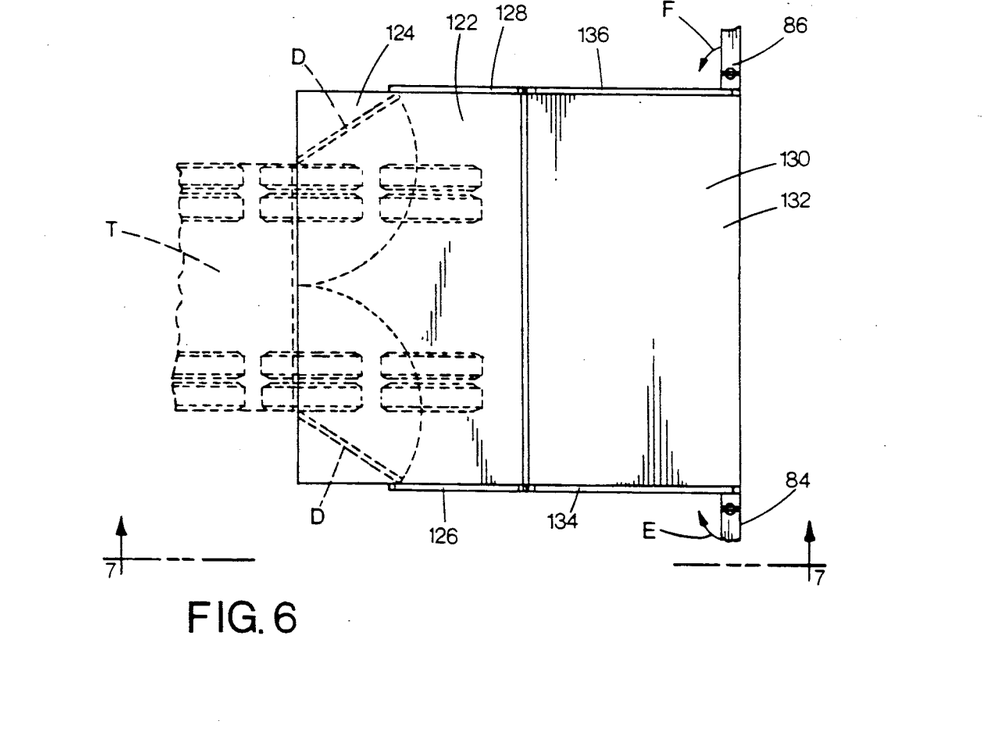
FIG. 6 is a partial plan view of the tipper of FIG. 2, showing the chute means.

For moving the tipper 10 to a new dumping location at a given dumping site, the back stabilizing means is raisable, as illustrated in phantom in FIG. 5. The actuators 96 and 98 are retracted to lift the respective pads 88 and 90 from the ground surface G. The pivotal attachment of wings 84 and 86 to apron 82 allows the wings to be folded forward along the frame sides as shown in FIG. 6 by arrows E and F, respectively. For highway travel, such as when moving the tipper 10 from the first dumping site to a second dumping site, the back stabilizing means 80 may be detached from frame 12 by removing pins or other attachment means connecting apron 82 to the frame back end 16. When removed, the back stabilizing means 80 may be placed on the deck upper surface 50 for such highway travel.

Referring now to FIGS. 3 and 4, the stabilizing means also includes front end stabilizing means 100. The front stabilizing means 100 comprises two opposing support members, such as A-frames 102 and 104 extending outwardly from each side of the frame 12. In the illustrated embodiment, A-frames 102 and 104 are pivotally attached to structural steel support members along the frame underside 18, such as cross member 26. A-frame 102 is attached adjacent I-beam 24 and extends under I-beam 22, while A-frame 104 is attached adjacent I-beam 22 and extends under I-beam 24. A-frames 102 and 104 each terminate in an outboard end having pivotal attachment means for receiving a ground-engaging float member, such as pads 106 and 108, respectively.

The front stabilizing means also includes two opposing frame lifting means, such as hydraulic actuators 110 and 112. Actuator 110 couples the outboard end of A-frame 102 to the first frame upper mounting member 28, while actuator 112 couples the outboard end of A-frame 104 to the second frame upper mounting member 30. The frame lifting means serve to lift and lower the frame front end 14.

To aid in imparting a low-profile dumping position to the tipper 10, the elevated mounting members 28 and 30 are elevated to a point above the deck upper surface 50 when the deck is in the lowered position. As shown in FIGS. 2 and 3, the front stabilizing means 100, with actuators 110 and 112 fully retracted, imparts a low-profile dumping position to the tipper 10. This low-profile position places the frame front end 14 near the ground surface G for receiving trailer T.

The front stabilizing means 100 may be used to hitch the tipper 10 to a vehicle V as shown in FIG. 1 for moving the tipper between locations. As shown in FIG. 3, the frame lifting actuators 110 and 112 are extended (shown in phantom) to lift the frame front end 14 to a raised towing position for attaching hitch 36 to a vehicle V as shown in FIG. 1. The front stabilizing means 100 may also be used for unhooking the tipper 10 from the vehicle V.

To move the tipper 10 between locations at a given dumping site, after hitching the tipper 10 to vehicle V, the front stabilizing means may be raised by retracting actuators 110 and 112 to disengage the ground G. For highway travel, such as between dump sites, the front stabilizing means 100 may be detached from frame 12. For example, the actuators 110 and 112 may be removed from the frame upper mounting members 28 and 30. The A-frames 102 and 104 may be removed from the frame undersurface 18. The actuators 110 and 112, the A-frames 102, 104 and the pads 106, 108 may be placed on the deck upper surface 50 during such highway travel.

In the low-profile dumping position, with the deck 40 in the lowered position, the deck upper surface 50 is inclined upwardly (relative to the ground surface G)

toward the frame back end 16. The placement of the backstop 54 at the distance C (see FIG. 1) from the frame back end 16 provides an elevation to the trailer T during tipping comparable to, and in some cases greater than, the earlier known tipper previously discussed in the Background portion of this specification. Thus, the low-profile tipper 10 may perform at least as well as, if not better than, this earlier tipper.

There are additional advantages to the low-profile tipper 10. For example, a towing vehicle, such as the semi-truck V in FIG. 1, hitched to a trailer T may back the trailer onto the deck 40 and into engagement with backstop 54. In this position during unhitching and hitching of the trailer, the semi-truck back tires are supported by the ramp 60, while the front tires and the majority of the cab remains on the ground G. Thus, costly and cumbersome hand rails along ramp 60 are not required to protect the truck driver from falling off a ten foot or higher ramp and deck, as in the known tipper discussed in the Background portion above.

The close proximity of the front stabilizing means 100 and the frame lower mounting member 32 provides a stronger and more compact tipper 10. The compact tipper 10 is more resistant to frame deformation from side loading by wind gusts, etc., than the earlier known tipper discussed in the Background of this specification. Thus, the tipper 10 requires less structural steel support members than this known tipper, rendering tipper 10 lighter than the earlier known tipper. Less steel in the frame renders the tipper 10 more economical to manufacture as less materials and labor are required to assemble the tipper. Furthermore, the lightweight nature of tipper 10 advantageously yields greater fuel economy for the towing vehicle V.

Figure 7:
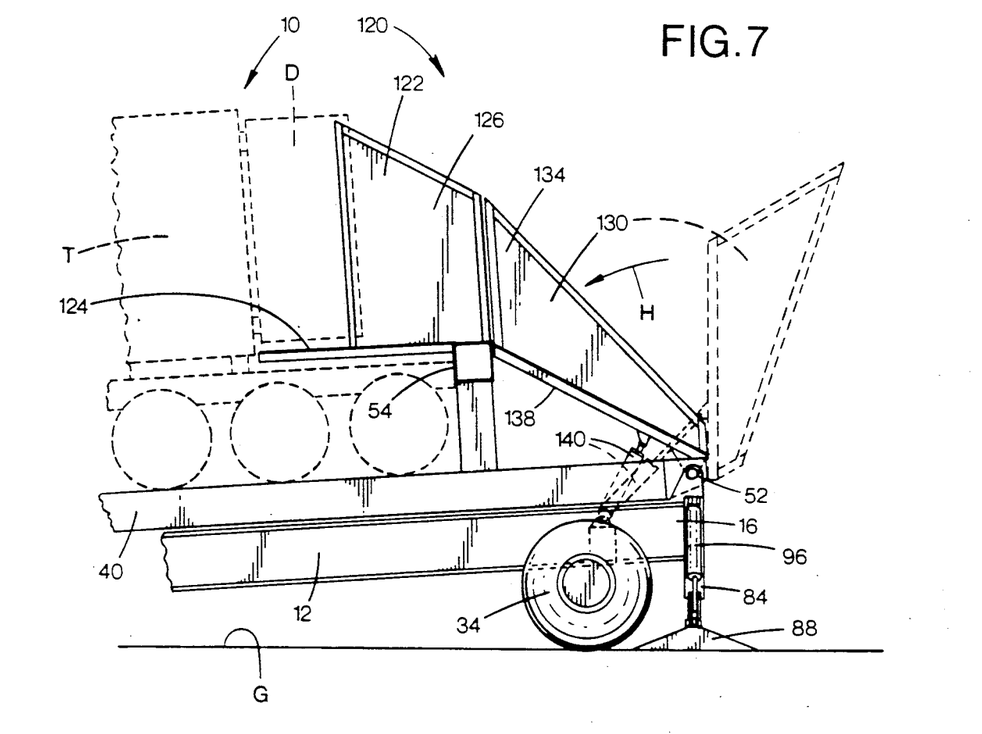
FIG. 7 is a side elevational view taken along line 7—7 of FIG. 6, showing the operation of the chute means in phantom.

Referring to FIGS. 6 and 7, the tipper 10 also includes chute means 120. The chute means 120 includes a stationary or fixed chute 122 mounted to and extending forwardly from the backstop 54. The fixed chute 122 includes a floor 124 extending from the backstop 54 forwardly to a point just beneath the trailer back opening. The fixed chute 122 also includes two opposing upwardly extending sidewalls 126 and 128 extending upwardly from a portion of each side of floor 124. The fixed chute 122 is sized so that the trailer doors D may be swung open as shown in phantom in FIG. 6 to engage the sidewalls 126 and 128. Latching means (not shown) may be included to secure the trailer doors D to the sidewalls 126 and 128 during dumping.

The chute means 120 also includes a pivoting chute 130 which is pivotally attached to the frame back end 16, such as by horizontal pivot pin 52. The pivoting chute 130 includes a floor 132 which extends forwardly from the point of pivotal attachment to the frame to meet with the rearward-most edge of the fixed chute floor 122. The chute floor 132 is fully bordered along each side by upright walls 134 and 136 which extend forwardly to meet the fixed chute sidewalls 126 and 128, respectively. The pivoting chute 130 also has an underside 138.

The trailer doors D, the fixed chute sidewalls 126 and 128, and the pivoting chute sidewalls 134 and 136 cooperate to direct the dumpable material from the trailer back opening to a point beyond the frame back end 16. As well as guiding the dumpable material, the chute sidewalls 126, 128, 134 and 136 aid in preventing the wind from blowing away the lighter weight components of the dumpable material, such as bits of paper or plastic if the dumpable material is garbage.

As shown in FIG. 7, after the contents have been dumped from trailer T, the deck 40 with the trailer T and fixed chute 122 may be lowered and the pivoting chute 120 may be left in a raised position, as shown in phantom. To retract the pivoting chute 130 to the lowered position, as indicated by arrow H, the chute means 120 also includes pivoting chute retracting means, which may include a pair of hydraulic actuators 140 and 142 (also see FIG. 5). As shown in FIG. 7, the chute retracting actuators, such as actuator 140, are retracted when the pivoting chute 130 is in a lowered position, and extended when the chute 130 is in a raised position (shown in phantom).

The tipper 10 also includes power means, such as power unit 150, which may be a 40 horsepower BRIGGS AND STRATTON engine or an electric motor powered by a 440 volt power source. The power unit 150 is advantageously mounted between cross member 26 and the forward-most point of the frame front end 14. This positioning of power unit 150 advantageously provides for better road balance of the tipper 10. This better road balance is achieved by a more even load distribution, wherein the weight of the power unit 150 offsets the weight of the chute means 120 near the back end of tipper 10. Thus, the tipper 10 hauls well at high speeds for highway travel.

In operation, the tipper 10 may be used to implement a method of successively removing the contents from a plurality of trailers T. The tipper 10 is positioned at a dumping location as shown in FIG. 2 by a towing vehicle V. A first trailer T hitched to a first towing vehicle (not shown) is backed onto ramp 60, and from ramp 60 onto the deck upper surface 50 and positioned on the deck against the backstop 54. The first trailer is then unhitched from the first towing vehicle. The trailer doors D are opened and latched in place against the fixed chute sidewalls 122 and 124. Of course, the doors could be opened first and the trailer unhitched afterward.

The deck 40 and the chute means 120 are raised by extending the elevating actuators, such as actuator 74, which also extends the chute actuators 140 and 142. In the raised position, the trailer contents fall under the influence of gravity from the trailer through the back opening. The trailer contents are guided by the doors D and chute means 120 to form a first pile (not shown) of dumpable material behind the tipper frame back end 16. In this manner, the first trailer is emptied.

The deck 40 is then lowered with the empty first trailer thereon to the lower position, adjacent the frame upper surface 20. During this lowering step, the pivoting chute 130 is left in the raised position (see FIG. 7). In a clearing away step, other equipment (not shown), such as bulldozers, blades and compactors may be used to remove the first pile from behind the tipper 10 while the pivoting chute 130 is in the upright position. The pile may be cleared away after dumping one trailer or after several trailers have been dumped, or if dumping over an embankment, clearing may not be required. During clearing, the raised chute 130 cooperates with the back stabilizing wings 84, 86 and apron 82 to prevent the dumped contents from being pushed forward onto the deck upper surface 20 and under the tipper.

In a successive clearing operation, while the first pile of dumpable material is being cleared from behind the tipper 10, the back doors D of the empty first trailer are closed and the trailer is hitched to the first towing vehicle. The empty first trailer is then driven off of deck 40 and ramp 60. This leaves the tipper 10 open so a second trailer may be backed by a second towing vehicle onto the tipper ramp 60, the deck upper surface 50 and positioned on the deck against backstop 54. The second trailer is unhitched from the second vehicle, and the doors D are opened and secured to the fixed chute sidewalls 126 and 128.

When the first pile of dumped material has been cleared away from behind the tipper 10, the pivoting chute 130 is lowered to the lower position by retracting the chute retracting actuators 140 and 142. When the chute 130 has been lowered and the doors D opened, the elevating actuators, such as actuator 74, extend to dump the contents from the second trailer T. In this manner, the steps above may be repeated with successive trailers to successively remove the contents from a plurality of trailers.

In a typical landfill application, the tipper 10 may be moved to new locations at a given dumping site four or five times daily. To do this, the ramp 60 may be raised and secured in a raised position by cable 70, as shown in FIG. 1. The front stabilizing means 100 is used to lift the tipper for hitching to a towing vehicle V as shown in FIGS. 1 and 3. When the tipper has been hitched, the front stabilizing pads 106 and 108 are retracted to the raised position by actuators 110 and 112, respectively. The back stabilizing pads 88 and 90 are retracted to the raised position by actuators 96 and 98, respectively. Wings 84 and 86 may be folded forward and against the frame 12, as indicated by arrows E and F in FIG. 6. In this configuration, the tipper may be moved to a new dumping location and returned to the dumping configuration shown in FIG. 2 by essentially reversing the above steps.

For moving the tipper 10 on a highway between dumping sites, the front and back stabilizing means 100 and 80, and the ramp 60 may be removed and placed on top of the deck upper surface 50.

Having illustrated and described the principles of our invention with respect to a preferred embodiment, it should be apparent to those skilled in the art that our invention may be modified in arrangement and detail without departing from such principles. For example, other actuating means may be employed, such as pneumatic cylinders. Suitable dimensional variations and materials may be substituted for the components of the tipper system. We claim all such modifications falling within the scope and spirit of the following claims.

We claim:

1. A portable tipper for dumping the contents from a trailer containing a dumpable material through a back opening of the trailer, the tipper comprising:
   an elongated frame having a front end and a back end;
   a deck having a front end and a back end, and means pivotally attaching the deck back end to the frame back end, the deck also having a backstop located a first distance from the deck back end so that the trailer may be positioned during dumping;
   elevating means coupling the deck to the frame for pivotally raising and lowering the deck front end between a lowered position with the deck adjacent the frame and a raised position with the deck front end above the frame;
   chute means for guiding the dumpable material from the trailer back opening past the deck back end, whereby the contents of a trailer which has been backed onto the deck may be dumped when the deck is raised by the elevating means to the raised position; and
   stabilizing means attached to the frame for stabilizing the tipper by engaging the ground surface adjacent the tipper, with the stabilizing means including back stabilizing means detachably attached to the frame back end, and front stabilizing means detachably attached to the frame at a first distance from the frame front end and at a point elevated above the deck when the deck is in the lowered position, wherein the front and back stabilizing means may be raised to disengage the ground surface on which the tipper rests for moving the tipper, such as to a new dumping location at a first dumping site, and the front and back stabilizing means may be detached from the frame, such as for highway travel when moving the tipper from the first dumping site to a second dumping site.

2. A portable tipper for dumping the contents from a trailer containing a dumpable material through a back opening of the trailer, the tipper comprising:
   an elongated frame having a front end and a back end;
   a deck having a front end and a back end, and means pivotally attaching the deck back end to the frame back end, the deck also having a backstop located a first distance from the deck back end so that the trailer may be positioned during dumping;
   elevating means coupling the deck to the frame for pivotally raising and lowering the deck front end between a lowered position with the deck adjacent the frame and a raised position with the deck front end above the frame; and
   chute means for guiding the dumpable material from the trailer back opening past the deck back end, the chute means including a fixed chute mounted to the deck backstop, a pivoting chute pivotally attached to the frame back end, and pivoting chute retracting means coupling the pivoting chute to the frame for pivotally raising and lowering the pivoting chute between a lowered position adjacent the fixed chute when the deck is in the lowered position and a raised position adjacent the fixed chute when the deck is in the raised position, whereby the pivoting chute may be retracted from the raised position to the lowered position independently from the deck by the pivoting chute retracting means, and further whereby the contents of a trailer which has been backed onto the deck may be dumped when the deck is raised by the elevating means to the raised position.

3. A portable tipper according to claim 1 wherein:
   the deck includes a deck surface for receiving the trailer, and the deck also includes mounting means elevated above the deck surface for mounting the elevating means to the deck above the deck surface; and
   the elevating means is pivotally connected to the deck mounting means.

4. A portable tipper according to claim 1 wherein the deck includes a deck surface laying in an inclined relation relative to the ground surface on which the tipper rests when the deck is in the lowered position, with the deck surface being inclined from the deck front end upwardly toward the deck back end.

5. A portable tipper according to claim 1 wherein the frame has an underside and the tipper further includes power means mounted to the frame underside between the frame front end and the front stabilizing means, with the power means for powering the elevating means and the front and back stabilizing means.

6. A portable tipper according to claim 1 further including a ramp having a back end pivotally and detachably attached to the frame front end so that the ramp may be pivoted upward to a raised position and secured in the raised position for moving the tipper, such as to a new dumping location at a first dumping site, and so that the ramp may be detached from the frame, such as for highway travel when moving the tipper from the first dumping site to a second dumping site.

7. A portable tipper according to claim 6 wherein the ramp back end is attached to the frame with the ramp back end adjacent the deck front end when the deck is in the lowered position.

8. A portable tipper according to claim 1 further including towing means attached to the frame front end for towing the tipper from a first dumping location to a second dumping location.

9. A portable tipper for dumping the contents from a trailer containing a dumpable material through a back opening of the trailer, the tipper comprising:

an elongated frame having a front end and a back end, an underside, two opposing side members, and two opposing upper mounting members each extending upwardly from one of the frame side members above the deck when the deck is in the lowered position;

a deck having a front end and a back end, and means pivotally attaching the deck back end to the frame back end, the deck also having a backstop located a first distance from the deck back end so that the trailer may be positioned during dumping;

elevating means coupling the deck to the frame for pivotally raising and lowering the deck front end between a lowered position with the deck adjacent the frame and a raised position with the deck front end above the frame; and chute means for guiding the dumpable material from the trailer back opening past the deck back end, whereby the contents of a trailer which has been backed onto the deck may be dumped when the deck is raised by the elevating means to the raised position; and stabilizing means attached to and extending outwardly from the frame for stabilizing the tipper, the stabilizing means comprising two opposing support members attached to the underside of the frame, each support member extending outwardly from one of the opposing side members and terminating in an outboard end having a ground-engaging pad member, the stabilizing means also including two opposing frame lifting means each coupling the outboard end of one of the support members to the frame upper mounting member which extends upwardly from the same frame side member from which the support member extends, each frame lifting means for lifting and lowering the frame front end between a lowered dumping position and a raised towing position.

10. A portable low-profile tipper for dumping the contents from a trailer containing a dumpable material, the tipper comprising:

a towable frame having front and back ends, and hitching means at the front end for hitching the tipper to a towing vehicle;

trailer support means for supporting the trailer during dumping;

means for pivotally attaching the trailer support means to the frame back end;

elevating means coupling the trailer support means to the frame for pivotally raising and lowering the trailer support means between a lowered position adjacent the frame and a raised position for dumping the trailer contents beyond the frame back end;

front stabilizing means detachably attached to and extending outwardly from the frame at a point elevated above the trailer support means when the trailer support means is in the lowered position and terminating in ground-engaging pad means for stabilizing the tipper by engaging the ground adjacent the tipper, the front stabilizing means also including frame lifting means for lifting and lowering the frame front end between a low-profile dumping position for receiving a trailer to be dumped and a raised towing position for moving the tipper between dumping locations; and back stabilizing means detachably attached to the frame back end, with the back stabilizing means being raised to disengage the ground surface on which the tipper rests for moving the tipper, such as to a new dumping location at a first dumping site, and the back stabilizing means being detachable from the frame, such as for highway travel when moving the tipper from the first dumping site to a second dumping site.

11. A portable low-profile tipper according to claim 10 further including chute means attached to the frame end and the trailer support means for guiding the dumpable material from the trailer past the frame back end.

12. A portable low-profile tipper for dumping the contents from a trailer containing a dumpable material, the tipper comprising:

a towable frame having front and back ends, and hitching means at the front end for hitching the tipper to a towing vehicle;

trailer support means for supporting the trailer during dumping;

means for pivotally attaching the trailer support means to the frame back end;

elevating means coupling the trailer support means to the frame for pivotally raising and lowering the trailer support means between a lowered position adjacent the frame and a raised position for dumping the trailer contents beyond the frame back end;

stabilizing means attached to and extending outwardly from the frame and terminating in ground-engaging pad means for stabilizing the tipper by engaging the ground adjacent the tipper, the stabilizing means also including frame lifting means for lifting and lowering the frame front end between a low-profile dumping position for receiving a trailer to be dumped and a raised towing position for moving the tipper between dumping locations;

a fixed chute mounted to the trailer support means;

a pivoting chute pivotally attached to the frame back end; and pivoting chute retracting means coupling the pivoting chute to the frame for pivotally raising and lowering the pivoting chute between a lowered position adjacent the fixed chute when the trailer support means is in the lowered position and a raised position adjacent the fixed chute when the trailer support means is in the raised position, whereby the pivoting chute may be retracted from the raised position to the lowered position independently from the trailer support means by the pivoting chute retracting means.

13. A portable low-profile tipper according to claim 10 wherein the trailer support means includes a trailer supporting surface laying in an inclined relation relative to the ground surface on which the tipper rests when the trailer support means is in the lowered position, with the trailer supporting surface being inclined upwardly toward the frame back end.

14. A portable low-profile tipper according to claim 12 further including ramp means pivotally attached to the frame front end for driving the trailer onto and off of the trailer support means.

15. A method of successively removing the contents from a plurality of trailers, each trailer having a back door closing a back opening, and each trailer containing a dumpable material, the method comprising the steps of:
  providing a tipper including:
    a frame having a front end and a back end;
    a deck having a back end, means for pivotally attaching the deck back end to the frame back end, and a backstop located a first distance from the deck back end for positioning the trailer during dumping;
    elevating means coupling the deck to the frame for pivotally raising and lowering the deck between a lowered position adjacent the frame and a raised position above the frame; and
    chute means pivotally attached to the frame back end for guiding the dumpable material from the back opening of the trailer past the deck back end, with the chute means including chute retracting means for pivotally raising and lowering the chute means between a lowered position at the initiation of dumping and a raised position during dumping;
  backing a first trailer containing a dumpable material with a first towing vehicle hitched to the first trailer onto the tipper deck when the deck is in the lowered position, and into position on the deck against the backstop;
  unhitching the first trailer from the first towing vehicle;
  opening the back door of the unhitched first trailer;
  raising the chute means and the deck with the first trailer thereon each to the raised position and dumping the first trailer contents through the back opening of the first trailer, thereby removing the contents from the first trailer to provide an empty first trailer and to form a first pile of dumpable material behind the tipper frame back end;
  lowering the deck with the empty first trailer thereon to the lower position while leaving the chute means in the raised position;
  closing the back door of the empty first trailer;
  hitching the empty first trailer to the first towing vehicle;
  driving the hitched empty first trailer off of the deck with the first towing vehicle;
  backing a second trailer containing a dumpable material with a second towing vehicle hitched to the second trailer onto the lowered deck, and into position on the deck against the backstop;
  unhitching the second trailer from the second towing vehicle;
  lowering the chute means; and
  repeating the opening, raising, lowering, closing, hitching and driving steps with the second trailer and so on with subsequent trailers to successively remove the contents from a plurality trailers containing a dumpable material.

16. A method according to claim 15 further including the steps of:
  clearing away the first pile of dumpable material from behind the tipper frame back end when the chute means is in the raised position, the clearing away step occurring substantially simultaneously with the steps of lowering the deck, hitching and driving away the empty first trailer, and backing the second trailer onto the deck; and
  wherein the step of lowering the chute means occurs upon completion of the clearing step.

17. A portable tipper for dumping the contents from a trailer containing a dumpable material, the tipper comprising:
  a frame having opposing front and back ends, an underside, two opposing side members, and first and second opposing upper mounting members each extending upwardly from one of the side members;
  towing means attached to the frame front end for enabling the towing at the tipper from a first dumping location to a second dumping location;
  a deck having opposing front and back ends, two opposing sides, means for pivotally attaching the deck back end to the frame back end, a deck surface for receiving the trailer, first and second elevated mounting members each extending upwardly from one of the deck sides above the deck surface, and a backstop located a first distance from the deck back end for positioning the trailer during dumping;
  a ramp having a back end pivotally attached to the frame front end with the ramp back end adjacent the deck front end when the deck is in the lowered position;
  elevating means coupling the first deck elevated mounting member to the first frame upper mounting member and coupling the second deck elevated mounting member to the second frame upper mounting member, the elevating means for pivotally raising and lowering the deck front end between a lowered position with the deck adjacent the frame and a raised position with the deck front end above the frame;
  stabilizing means extending outwardly from the frame side members and terminating in ground-engaging pad means for stabilizing the tipper by engaging the ground adjacent the tipper, the stabilizing means also including frame lifting means for lifting and lowering the frame front end between a low-profile dumping position for receiving a trailer to be dumped and a raised towing position for moving the tipper between dumping locations; and
  chute means for guiding the dumpable material from the trailer past the deck back end, with the chute means including a fixed chute mounted to the deck backstop, a pivoting chute pivotally attached to the frame back end, and pivoting chute retracting means coupling the pivoting chute to the frame for pivotally raising and lowering the pivoting chute between a lowered position adjacent the fixed chute when the deck is in the lowered position and a raised position adjacent the fixed chute when the deck is in the raised position, so as to retract the pivoting chute from the raised position to the lowered position independent of the lowering of the deck, whereby the contents of a trailer which has been backed onto the deck may be dumped when the deck is raised by the elevating means to the raised position.

18. A portable tipper according to claim 17 wherein the ramp and the stabilizing means are each raisable from the ground and each is detachably attached to the frame, whereby the ramp and stabilizing means may each be raised to raised positions and secured in the raised positions for moving the tipper, such as to a new dumping location at a first dumping site, and whereby the ramp and stabilizing means may each be detached from the frame, such as for highway travel when moving the tipper from the first dumping site to a second dumping site.

* * * * *

UNITED STATES PATENT AND TRADEMARK OFFICE
CERTIFICATE OF CORRECTION

PATENT NO. : 5,080,548
DATED : January 14, 1992
INVENTOR(S) : Kenneth A. Bratlie, et al.

It is certified that error appears in the above-identified patent and that said Letters Patent is hereby corrected as shown below:

Column 3, line 56 , "description and" should be --description and drawings--;

Column 3, line 68, "line 3--of" should be --line 3--3 of--; and

Column 14, line 27, "towing at the tipper" should be --towing of the tipper--.

Signed and Sealed this

Twenty-eighth Day of September, 1993

Attest:

BRUCE LEHMAN

Attesting Officer          Commissioner of Patents and Trademarks